United States Patent
Yang et al.

(10) Patent No.: US 9,034,177 B2
(45) Date of Patent: May 19, 2015

(54) DRAINAGE DEVICE FOR CLOSED CHAMBER CONTAINING LIQUID

(75) Inventors: Ming-Lu Yang, New Taipei (TW); Ya-Dong Zhang, Shenzhen (CN); Tian-En Zhang, Shenzhen (CN); Yue Li, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 635 days.

(21) Appl. No.: 13/242,026

(22) Filed: Sep. 23, 2011

(65) Prior Publication Data
US 2013/0014834 A1 Jan. 17, 2013

(30) Foreign Application Priority Data
Jul. 11, 2011 (CN) .......................... 2011 1 0192158

(51) Int. Cl.
*F15D 1/00* (2006.01)
*E02B 11/00* (2006.01)
*B01D 35/26* (2006.01)
*F04B 53/10* (2006.01)
*F04B 1/02* (2006.01)

(52) U.S. Cl.
CPC ............... *E02B 11/00* (2013.01); *B01D 35/26* (2013.01); *F04B 53/106* (2013.01); *F04B 53/108* (2013.01); *F04B 1/02* (2013.01)

(58) Field of Classification Search
CPC ..................................................... F04B 53/106
See application file for complete search history.

(56) References Cited

U.S. PATENT DOCUMENTS

| | | | | |
|---|---|---|---|---|
| 2,256,145 | A * | 9/1941 | Hock | 210/445 |
| 2,338,418 | A * | 1/1944 | Forrest et al. | 210/412 |
| 2,338,419 | A * | 1/1944 | Forrest et al. | 210/412 |
| 2,649,205 | A * | 8/1953 | Quinn | 210/416.3 |
| 3,957,401 | A * | 5/1976 | Sweeney et al. | 417/395 |
| 5,178,752 | A * | 1/1993 | McKinnon | 210/121 |
| 5,771,935 | A * | 6/1998 | Myers | 137/859 |
| 8,216,462 | B2 * | 7/2012 | O'Brien et al. | 210/200 |
| 2004/0009081 | A1 * | 1/2004 | Grapes | 417/478 |

* cited by examiner

*Primary Examiner* — Terry Cecil
(74) *Attorney, Agent, or Firm* — Novak Druce Connolly Bove + Quigg LLP

(57) ABSTRACT

A drainage device for draining liquid out of a closed chamber includes an air cylinder, a driving assembly, a first channel, a second channel, a first sealing assembly, a second sealing assembly, and a controller. The air cylinder includes a main body defining a receiving chamber, an action piston positioned in the receiving chamber of the main body, and a connecting rod connected to the action piston. The main body defines a liquid inlet and a liquid outlet, both of which communicate with the receiving chamber, and the presence of a fixed piston with a seal in each of the inlet and outlet creates a double-acting one-way valve when the action piston is moved up and down.

16 Claims, 3 Drawing Sheets

DRAINAGE DEVICE FOR CLOSED CHAMBER CONTAINING LIQUID

CROSS-REFERENCE TO RELATED APPLICATIONS

This application is related to two co-pending U.S. patent applications, which are: application Ser. No. 13/242,011, application Ser. No. 13/242,006, and all entitled "DRAINAGE DEVICE FOR CLOSED CHAMBER CONTAINING LIQUID". In this co-pending applications, the inventors are Yang et al. Such co-pending applications have the same assignee as the present application. The disclosure of the above two identified applications are incorporated herein by reference.

BACKGROUND

1. Technical Field

The present disclosure generally relates to drainage devices, and particularly, to a drainage device for draining liquid out of a closed chamber.

2. Description of the Related Art

In the discharge of sewage, sewage is generally sucked into a container to be purified by a water suction cleaner, and then discharged outside. The sewage suction cleaner includes a closed chamber and an air pump. The air pump creates a certain degree of vacuum in the closed chamber. Under the negative air pressure, the sewage is pushed into the closed chamber. However, when discharging the sewage, outside air will flow into the closed chamber via an outlet, and thus the degree of vacuum of the closed chamber is decreased. As a result, the air pressure difference between the inside and the outside of the closed chamber is decreased, and sewage is not forced as strongly into the closed chamber.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
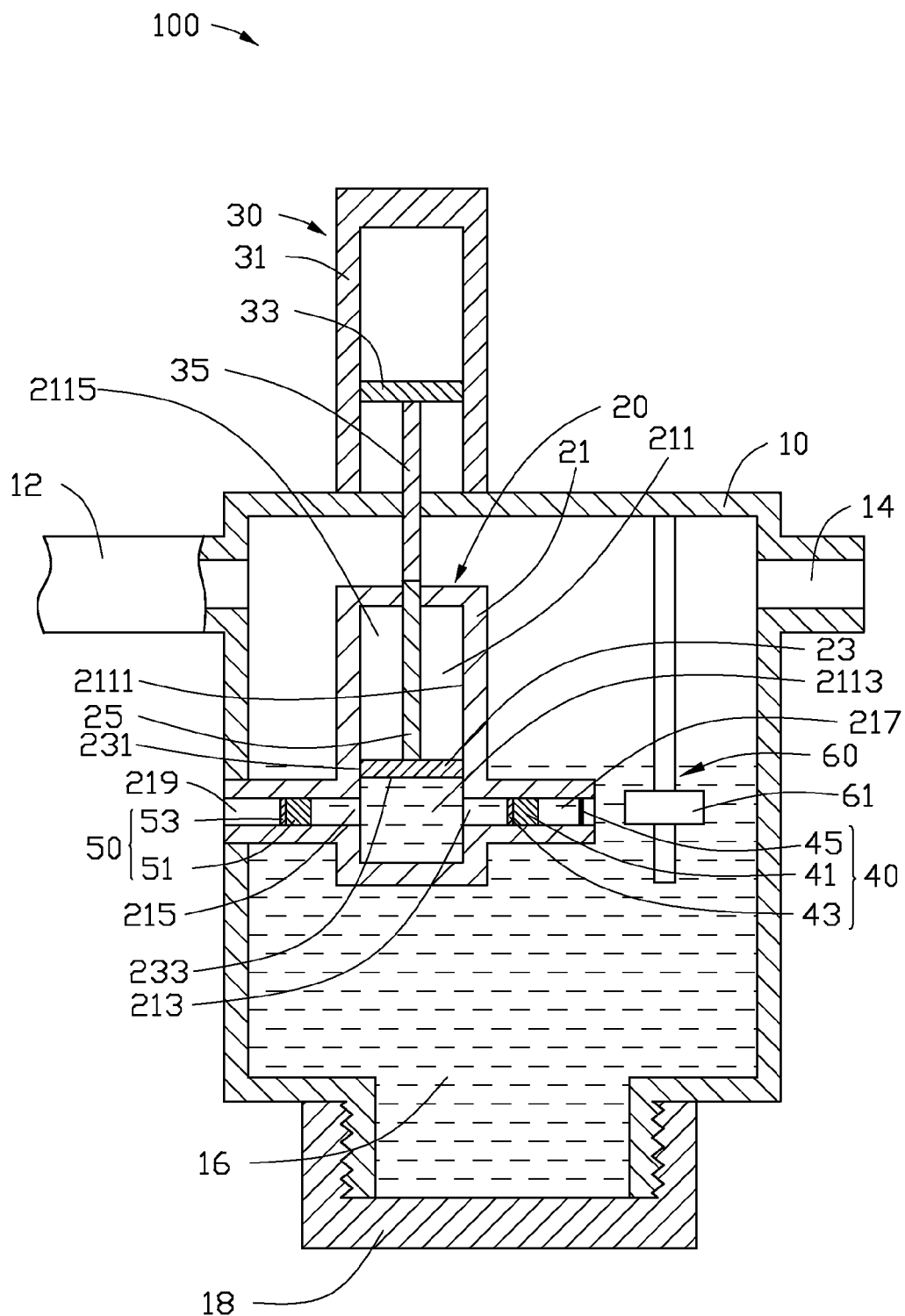
FIG. 1 is a sectional view of an embodiment of a drainage device in a first state.

Referring to FIG. 1, an embodiment of a drainage device 100 includes an air cylinder 20, a driving assembly 30, a first sealing assembly 40, a second sealing assembly 50, and a controller 60.

A closed chamber 10 defines a fluid channel 12 and a gas channel 14 in the top end, and a slag discharge hole 16 in the bottom end of the closed chamber 10. The closed chamber 10 further includes a sealing cover 18 for sealing the slag discharge hole 16. The fluid channel 12 is used for liquid flow, and is equipped with a flow control valve (not shown). The gas channel 14 is connected to an air pump (not shown) for producing a certain degree of vacuum in the closed chamber 10.

The air cylinder 20 is positioned in the closed chamber 10, and includes a main body 21, an action piston 23 positioned in the main body 21, and a connecting rod 25 connected to the action piston 23, a first channel 217, and a second channel 219 opposite to the first channel 217. The main body 21 is substantially cylindrical, and defines a receiving chamber 211. One end of the main body 21 defines a liquid inlet 213 and a liquid outlet 215 communicating with the receiving chamber 211, and the other end of the main body 21 is hermetically sealed. The liquid inlet 213 is opposite to the liquid outlet 215. The first channel 217 communicates with the liquid inlet 213, and the second channel 219 communicates with the liquid outlet 215. The first channel 217 is below the level of the liquid of the closed chamber 10. The liquid in the receiving chamber 211 may be discharged outside the closed chamber 10 via the second channel 219.

The action piston 23 is movably received in the receiving chamber 211, and forms a sealing surface 231 against a sidewall 2111 of the main body 21, and a resisting surface 233 adjacent to the liquid inlet 213. The action piston 23 separates or segregates the receiving chamber 211 into a first chamber 2113 and a second chamber 2115. The first chamber 2113 communicates with the liquid inlet 213 and the liquid outlet 215. The action piston 23 is fixed to the bottom of the connecting rod 25, which extends through the top end of the main body 21.

The driving assembly 30 includes a receiving body 31, a drive piston 33 movably received in the receiving body 31, and a drive rod 35. The receiving body 31 is positioned on the outer surface of the closed chamber 10. The drive rod 35 connects the drive piston 33 to the connecting rod 25.

The first sealing assembly 40 is positioned in the first channel 217, and includes a fixed piston 41, a flexible member 43, and a filter 45. The flexible member 43 and the filter 45 are positioned on opposite sides of the fixed piston 41, and the flexible member 43 is closer to the liquid inlet 213. The fixed piston 41 defines a plurality of permeable holes (not shown), so that any liquid in the closed chamber 10 can flow to the receiving chamber 211 via the permeable holes. The flexible member 43 is attached to the inner surface of the first channel 217 in order to seal the first channel 217. In the illustrated embodiment, the flexible member 43 is a circular silicone mat, and the filter 45 is a metal mesh filter, and functions as a large-scale filter of the liquid flowing into the receiving chamber 211.

The second sealing assembly 50 is positioned in the second channel 219, and includes a fixed piston 51 and a flexible member 53. The fixed piston 51 has a similar structure and function to those of the fixed piston 41. The flexible member 53 has a similar structure and function to those of the flexible member 43.

The controller 60 includes a sensor 61 positioned beneath the surface of the liquid in the closed chamber 10. The controller 60 monitors the level of any liquid in the closed chamber 10 by means of the sensor 61 and controls the movements of the driving assembly 30.

In assembly of the drainage device 100, the air cylinder 20 is positioned in the closed chamber 10, with the liquid inlet 213 and the liquid outlet 215 being immersed in the liquid of the closed chamber 10. The first sealing assembly 40 is positioned in the first channel 217, and the second sealing assembly 50 is positioned in the second channel 219. The fixed piston 41 is fixed to the inner surface of the first channel 217. The flexible member 43 is fixed to the liquid inlet 213-side of the fixed piston 41. The filter 45 is positioned in the first channel 217 and away from the flexible member 43. The fixed piston 51 is fixed to the inner surface of the second channel 219. The flexible member 53 is fixed away from the liquid outlet 215-side of the fixed piston 51.

The driving assembly 30 is fixed on the outer surface of the closed chamber 10. The drive rod 35 connects the drive piston 33 to the connecting rod 25. The controller 60 is positioned in the closed chamber 10.

Figure 2:
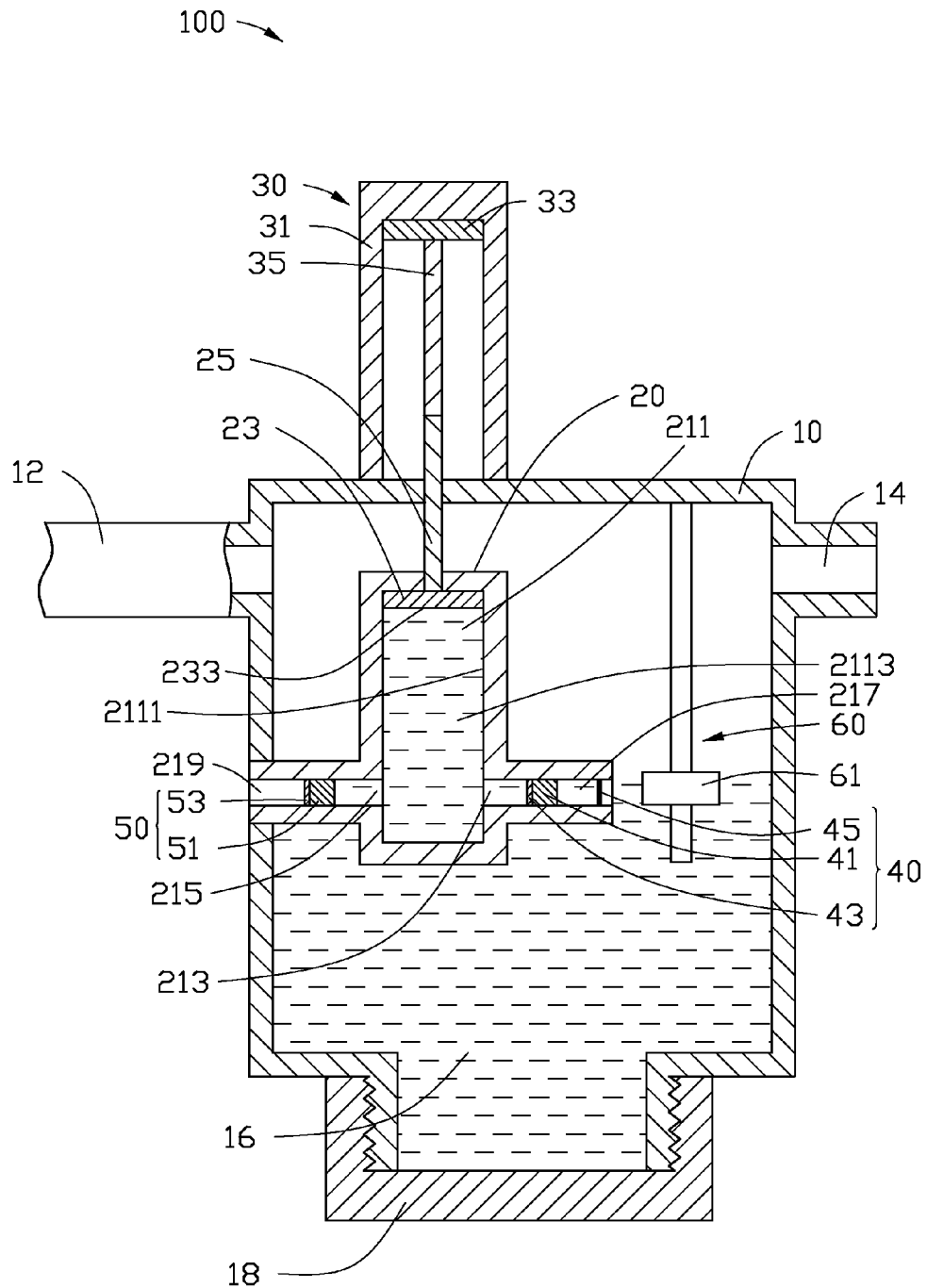
FIG. 2 is a sectional view of the drainage device of FIG. 1 in the first state with a receiving chamber full of liquid.

Referring to FIGS. 1 and 2, in use, the closed chamber 10 is subjected to a predetermined degree of vacuum via the air pump, and liquid is sucked into the closed chamber 10 via the fluid channel 12. When the liquid level in the closed chamber 10 exceeds a predetermined level, the sensor 61 generates a signal. The controller 60 transmits a start signal to the driving assembly 30, and then the driving assembly 30 starts to work. The drive rod 35 drives the connecting rod 25 to move upwards. As a result, the action piston 23 slides in the receiving chamber 211 away from the liquid inlet 213, and as the volume of the first chamber 2113 is increased, the air pressure in the first chamber 2113 is reduced. The air pressure difference between the first chamber 2113 and the closed chamber 10 causes the liquid in the closed chamber 10 to move through the filter 45 and the fixed piston 41, and to be sucked into the first chamber 2113 because of the negative air pressure. This is the drainage device 100 in the first state.

Figure 3:
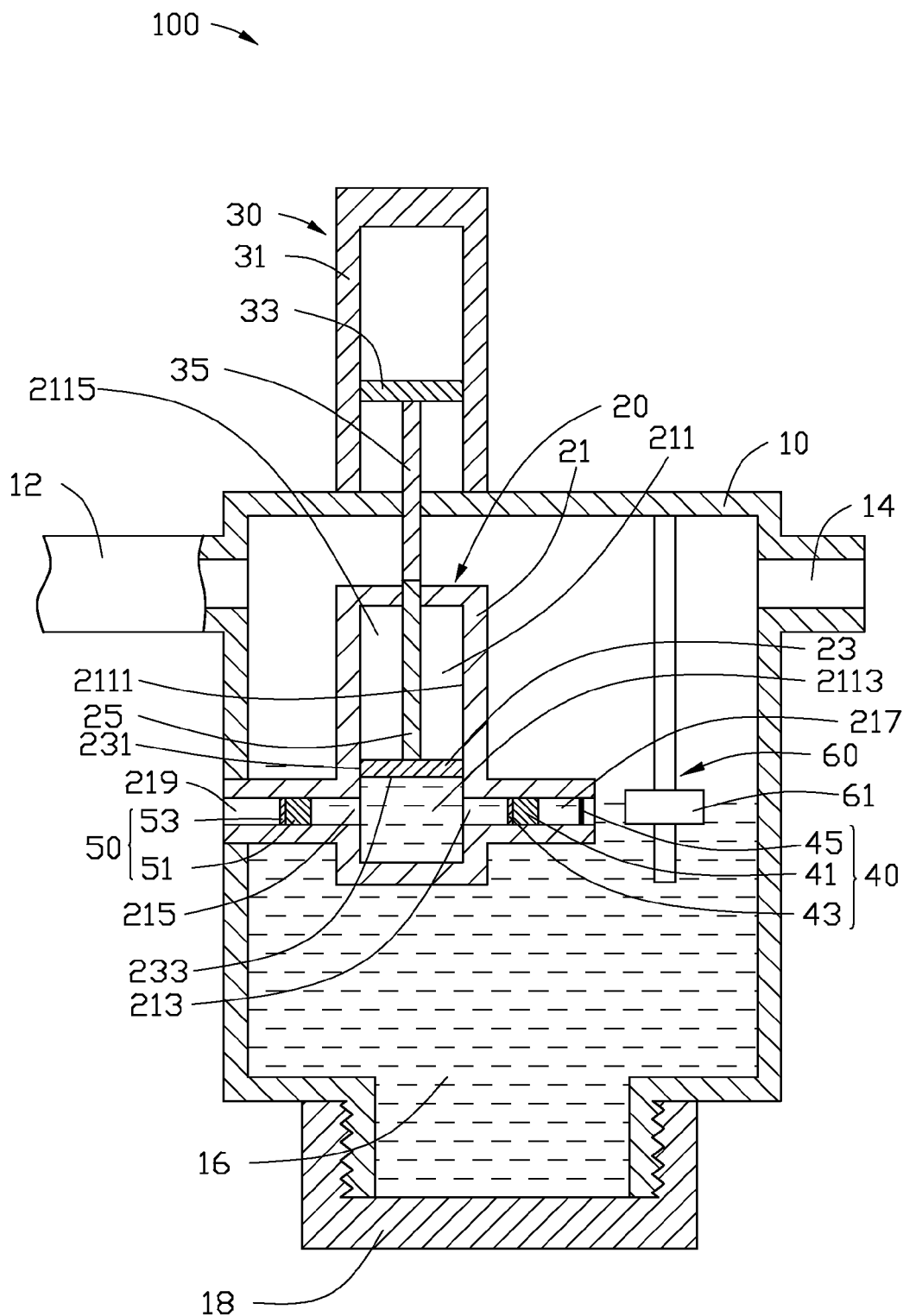
FIG. 3 is a sectional view of the drainage device of FIG. 1 in a second state.

When the action piston 23 has moved the maximum distance upward relative to the liquid inlet 213, the first chamber 2113 is filled with liquid as shown in FIG. 2. Referring to FIG. 3, after the first chamber 2113 is filled with liquid, the drive rod 35 drives the connecting rod 25 to move downwards. As a result, the action piston 23 slides in the receiving chamber 211 towards the liquid inlet 213, thereby reducing the volume of the first chamber 2113 and thus increasing the pressure. Under pressure, the liquid in the first chamber 2113 is forced through or around the flexible member 53 and into the second channel 219, the flexible member 43 is pressed tightly against the fixed piston 41 by means of the applied pressure. This is the drainage device 100 in the second state, in which the liquid in the first chamber 2113 is being discharged to the outside via the second channel 219.

As the drainage device 100 continuously operates between the first state and the second state, the liquid in the closed chamber 10 is drained to the outside. When the liquid level in the closed chamber 10 again falls to the predetermined level, the sensor 61 detects it and generates a closing signal. The controller 60 transmits the closing signal to the driving assembly 30, and then the drainage device 100 stops. In addition, if there is sediment which has accumulated at the bottom of the closed chamber 10, the sealing cover 18 can be opened to remove the sediment from the closed chamber 10. It should be pointed out that, the connecting rod 25 and the drive rod 35 can be integrally formed.

When the liquid of the closed chamber 10 flows into the first chamber 2113 via the first channel 217, the flexible member 53 seals the second channel 219. When the liquid of the first chamber 2113 flows to the outside via the second channel 219, the flexible member 43 seals the first channel 217. Therefore, the outside air cannot reach the inside of the closed chamber 10 at any time.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A drainage device for draining liquid out of a closed chamber, comprising:

an air cylinder comprising a main body, the main body defining a receiving chamber, an action piston positioned in the receiving chamber of the main body, and a connecting rod connected to the action piston, wherein the main body defines a liquid inlet and a liquid outlet, the action piston forms a sealing surface attached to a sidewall of the receiving chamber, thereby separating the receiving chamber into a first chamber and a second chamber, both of the liquid inlet and the liquid outlet communicate with the first chamber;

a driving assembly connected to the connecting rod;

a first channel connected to the liquid inlet;

a second channel connected to the liquid outlet;

a first sealing assembly positioned in the first channel, the first sealing assembly comprising a fixed piston and a flexible member, the flexible member attached to a side of the fixed piston adjacent to the liquid inlet; and a second sealing assembly positioned in the second channel, the second sealing assembly comprising a fixed piston and a flexible member, the flexible member of the second sealing assembly attached to a side of the fixed piston of the second sealing assembly away from the liquid outlet;

wherein the driving assembly drives the action piston to slide in the receiving chamber away from the liquid inlet, such that the liquid in the closed chamber flowing into the first chamber of the receiving chamber through the first sealing assembly and the liquid inlet, and sealed in the receiving chamber; the driving assembly drives the action piston to slide in the receiving chamber towards the liquid inlet, such that the liquid in the first chamber is discharged to the outside through the liquid outlet and the second sealing assembly via the second channel, the flexible member of the first sealing assembly is a silicone mat and configured to be pressed tightly against the fixed piston of the first sealing assembly by means of applied pressure, to enable liquid in the first chamber to be discharged to the outside via the second channel.

2. The drainage device of claim 1, further comprising a controller, wherein the controller comprises a sensor, and the sensor detecting the liquid level in the closed chamber and controlling the movements of the driving assembly.

3. The drainage device of claim 1, wherein the first sealing assembly further comprises a filter, and the filter is positioned in the first channel and opposite to the fixed piston.

4. The drainage device of claim 3, wherein the flexible member is substantially circular, and the filter is a metal mesh filter.

5. The drainage device of claim 1, wherein the driving assembly includes a receiving body, a drive piston movably received in the receiving body, and a drive rod; the receiving body is positioned on the outer surface of the closed chamber, and the drive rod connects the drive piston to the connecting rod.

6. The drainage device of claim 1, wherein the closed chamber defines a fluid channel and a gas channel in a top end, and a slag discharge hole in a bottom end thereof.

7. The drainage device of claim 6, wherein the closed chamber further includes a sealing cover for sealing the slag discharge hole.

8. A drainage device for draining liquid out of a closed chamber, comprising:

an air cylinder comprising a main body, the main body defining a receiving chamber, and an action piston positioned in the receiving chamber of the main body, the main body defining a liquid inlet and a liquid outlet, the action piston forming a sealing surface attached to a sidewall of the receiving chamber, thereby separating the receiving chamber into a first chamber and a second chamber, the liquid inlet and the liquid outlet communicating with the first chamber;

a driving assembly connected to the action piston;

a first channel communicating with the first chamber;

a second channel communicating with the first chamber;

a first sealing assembly positioned in the first channel, the first sealing assembly comprising a fixed piston and a flexible member, the flexible member attached to a side of the fixed piston adjacent to the liquid inlet; and a second sealing assembly positioned in the second channel, the second sealing assembly comprising a fixed piston and a flexible member, the flexible member of the second sealing assembly attached to a side of the fixed piston of the second sealing assembly away from the liquid outlet;

wherein the driving assembly drives the action piston to slide in the receiving chamber away from the liquid inlet, such that the liquid in the closed chamber flowing into the first chamber of the receiving chamber through the first sealing assembly and the liquid inlet, the driving assembly drives the action piston to slide in the receiving chamber towards the liquid inlet, such that the liquid in the first chamber is discharged to the outside through the liquid outlet and the second sealing assembly via the second channel, the flexible member of the first sealing assembly is a silicone mat and configured to be pressed tightly against the fixed piston of the first sealing assembly by means of applied pressure, to enable liquid in the first chamber to be discharged to the outside via the second channel.

9. The drainage device of claim 8, further comprising a controller, wherein the controller comprises a sensor, and the sensor detecting the liquid level in the closed chamber and controlling the movements of the drive assembly.

10. The drainage device of claim 8, wherein the first sealing assembly further comprises a filter, and the filter is positioned in the first channel and opposite to the fixed piston.

11. The drainage device of claim 10, wherein the flexible member is substantially circular, and the filter is a metal mesh filter.

12. The drainage device of claim 8, wherein the driving assembly includes a receiving body, a drive piston movably received in the receiving body, and a drive rod; the receiving body is positioned on the outer surface of the closed chamber, and the drive rod connects the drive piston to the connecting rod.

13. The drainage device of claim 8, wherein the closed chamber defines a fluid channel and a gas channel in a top end, and a slag discharge hole in a bottom end thereof.

14. The drainage device of claim 13, wherein the closed chamber further includes a sealing cover for sealing the slag discharge hole.

15. The drainage device of claim 8, wherein the action piston is configured to move vertically in the main body, the first channel and the second channel are horizontally arranged, the fixed piston and the flexible member of the first sealing assembly are positioned in the first channel, the fixed piston and the flexible member of the second sealing assembly are positioned in the second channel.

16. The drainage device of claim 8, wherein the main body, the first channel, and the second channel are received in the closed chamber.

* * * * *